(12) United States Patent
Seo et al.

(10) Patent No.: US 9,995,403 B2
(45) Date of Patent: Jun. 12, 2018

(54) BALL VALVE WITH DUAL SEALING STRUCTURE

(71) Applicants: HS Valve Co., Ltd., Daegu (KR); M.T. DEASON COMPANY, INC., Irondale, AL (US)

(72) Inventors: Joungdae Seo, Gyeongsan-si (KR); Youn Gil Jung, Yeongcheon-si (KR); Hyunseok Yun, Pohang-si (KR)

(*) Notice: Subject to any disclaimer, the term of this patent is extended or adjusted under 35 U.S.C. 154(b) by 0 days. days.

(21) Appl. No.: 15/650,872

(22) Filed: Jul. 15, 2017

(65) Prior Publication Data
US 2018/0045321 A1 Feb. 15, 2018

(30) Foreign Application Priority Data
Aug. 11, 2016 (KR) .......................... 10-2016-0102089

(51) Int. Cl.
| | |
|---|---|
| *F16K 5/06* | (2006.01) |
| *F16K 1/228* | (2006.01) |
| *F16K 5/20* | (2006.01) |
| *F16K 27/06* | (2006.01) |

(52) U.S. Cl.
CPC .......... *F16K 5/0673* (2013.01); *F16K 1/2285* (2013.01); *F16K 5/201* (2013.01); *F16K 27/067* (2013.01)

(58) Field of Classification Search
CPC ...... F16K 5/0673; F16K 5/201; F16K 27/067; F16K 1/2285
USPC .......... 251/315.01, 315.1, 174, 192, 180–182
See application file for complete search history.

(56) References Cited

U.S. PATENT DOCUMENTS

| | | | | | |
|---|---|---|---|---|---|
| 3,584,641 | A | * | 6/1971 | Milleville | ............. F16K 5/0673 |
| | | | | | 251/172 |
| 3,656,711 | A | * | 4/1972 | Toelke | .................. F16K 5/0673 |
| | | | | | 251/315.13 |
| 3,721,425 | A | * | 3/1973 | Jones | .................... F16K 5/0678 |
| | | | | | 251/174 |
| 4,477,055 | A | * | 10/1984 | Partridge | ............. F16K 5/0673 |
| | | | | | 137/328 |
| 4,483,511 | A | * | 11/1984 | Kushida | .................. F16K 5/201 |
| | | | | | 251/172 |

FOREIGN PATENT DOCUMENTS

KR   10-1156108   6/2012

OTHER PUBLICATIONS

English translation of 10-1156108.

* cited by examiner

*Primary Examiner* — John Bastianelli
(74) *Attorney, Agent, or Firm* — Antonio Ha & U.S. Patent, LLC

(57) ABSTRACT

A dual sealing ball valve comprises a valve body, conduit line connectors coupled to both sides of the valve body, a hollow ball disposed in the valve body, a sheet holder mounted on an inner circumferential surface of at least one of the conduit line connectors, a main sheet tightly contacting the ball around an inlet of the hollow ball, and an elastic sheet mounted on the front surface of the sheet holder. The sheet holder includes a sheet ring supporting the main sheet and the elastic sheet in a front direction, supporting the elastic sheet towards the main sheet, and pushed in the front direction by a pressurizing retainer and a sheet cap coupled to the sheet ring and contacting the main sheet to pressurize the main sheet in a rear direction and towards the elastic sheet.

6 Claims, 7 Drawing Sheets

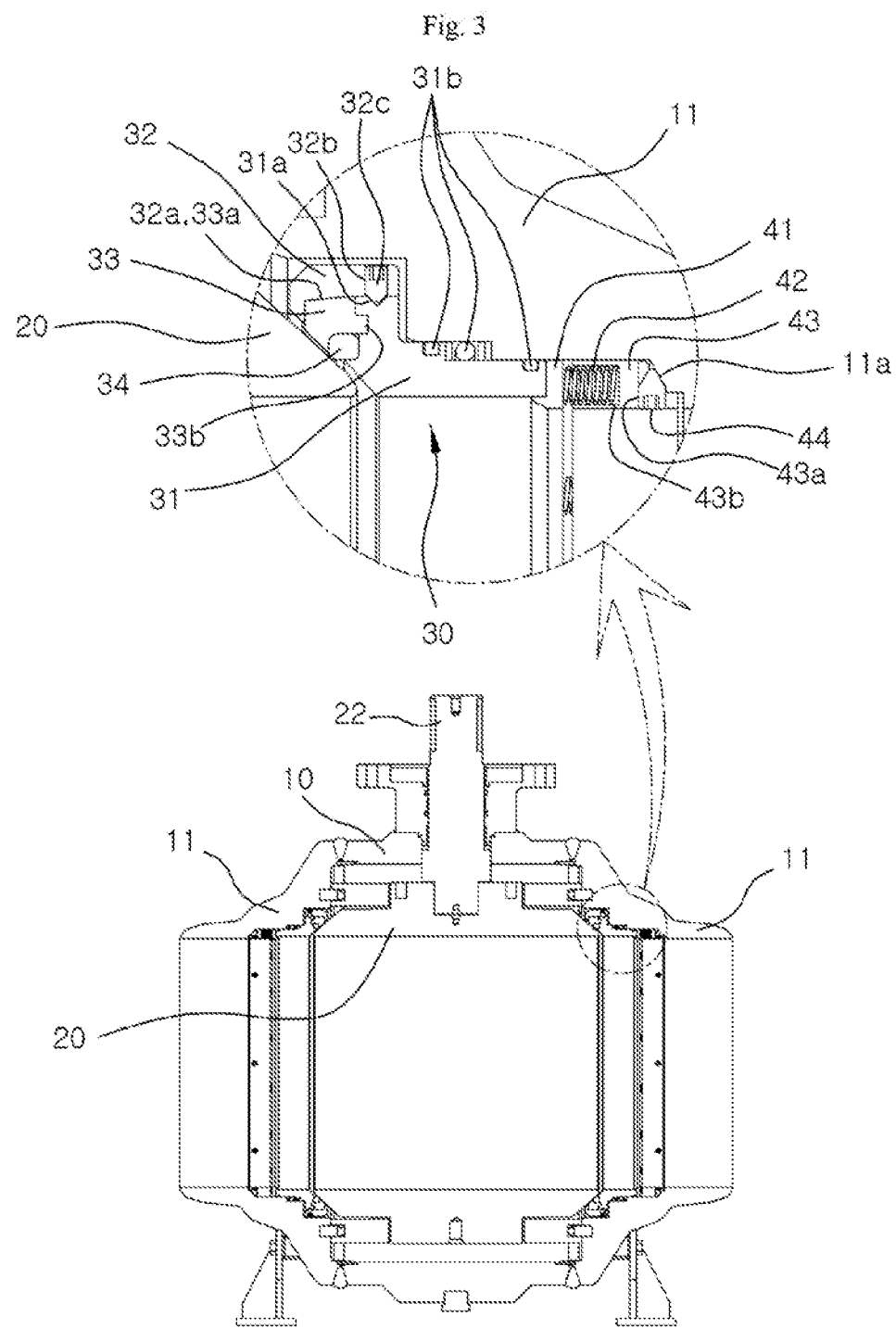

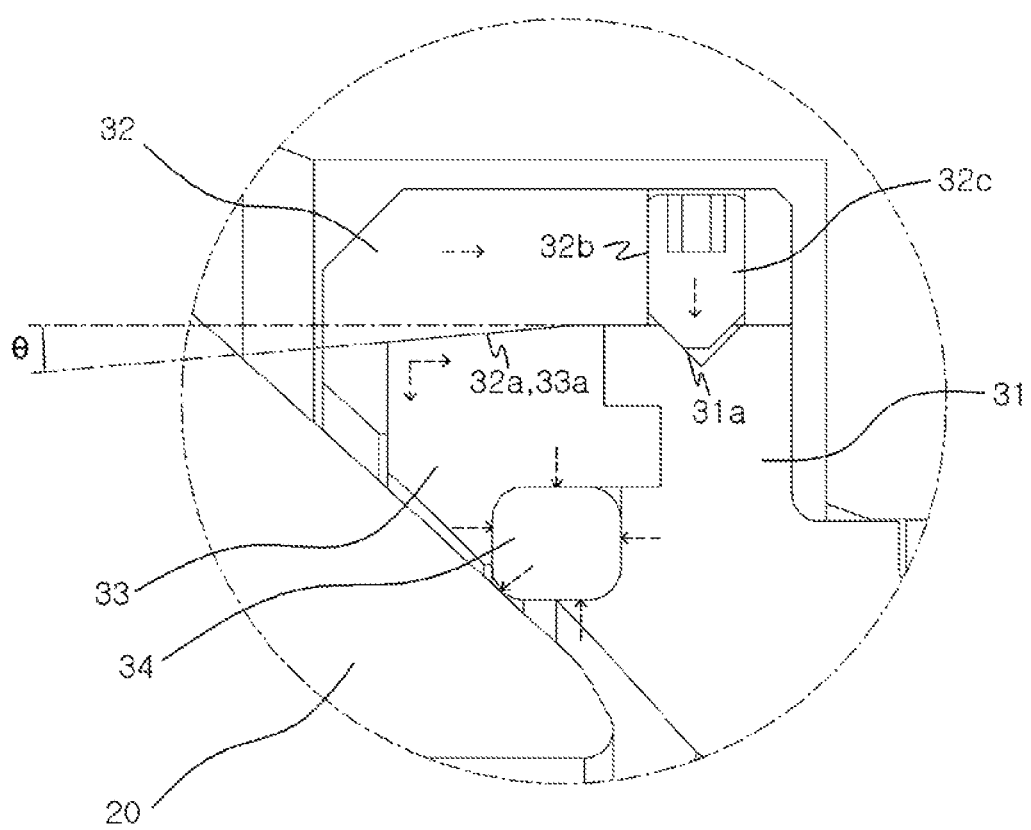

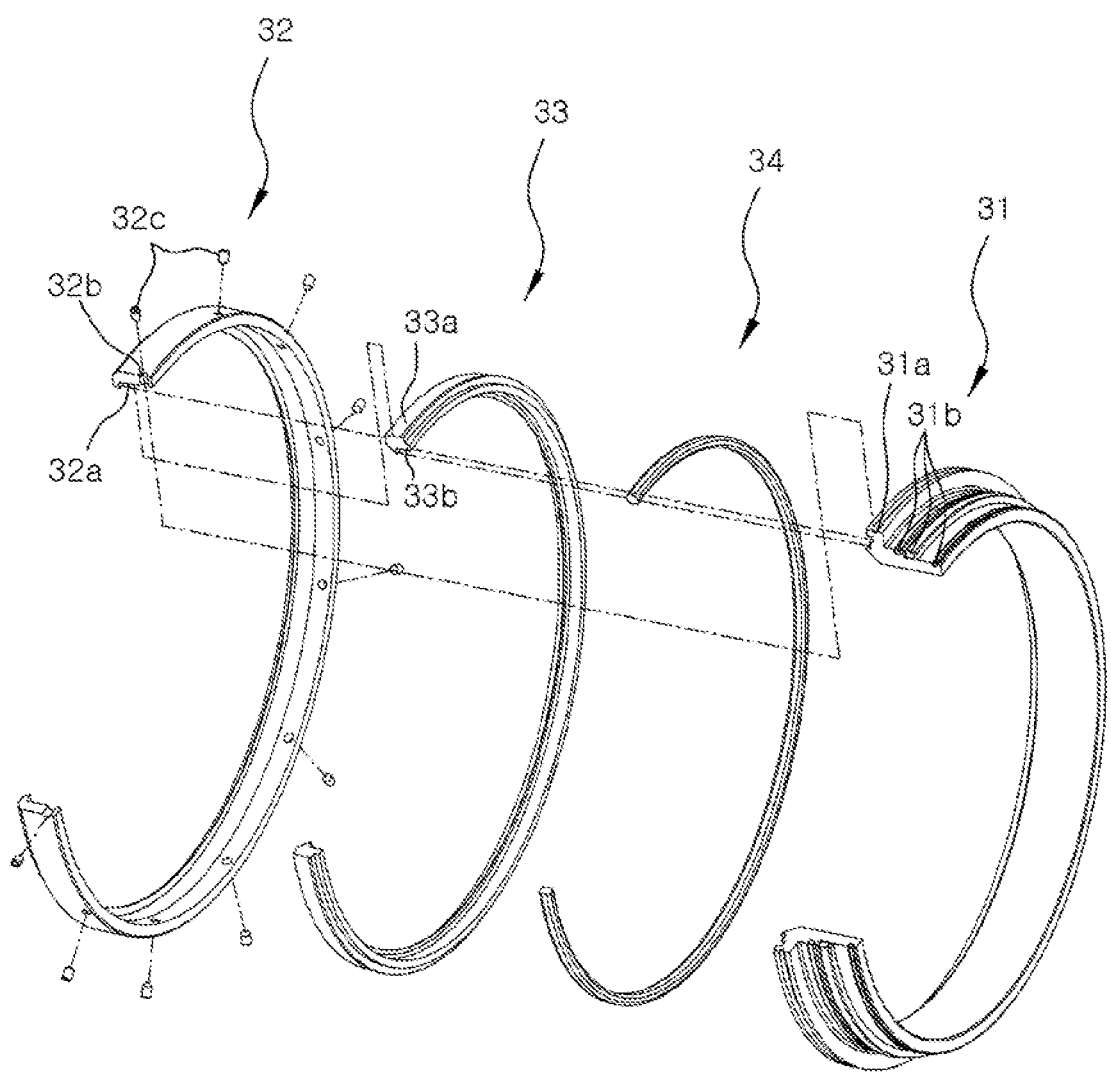

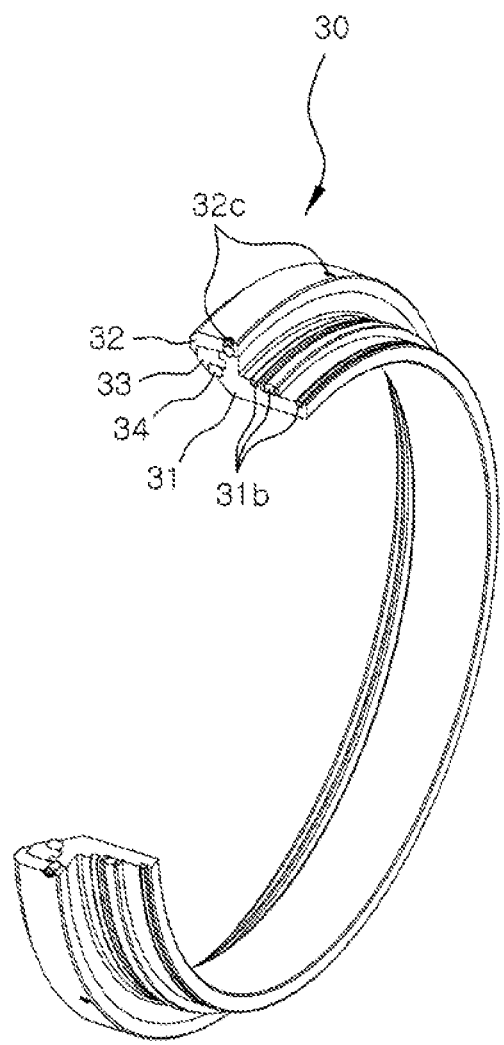

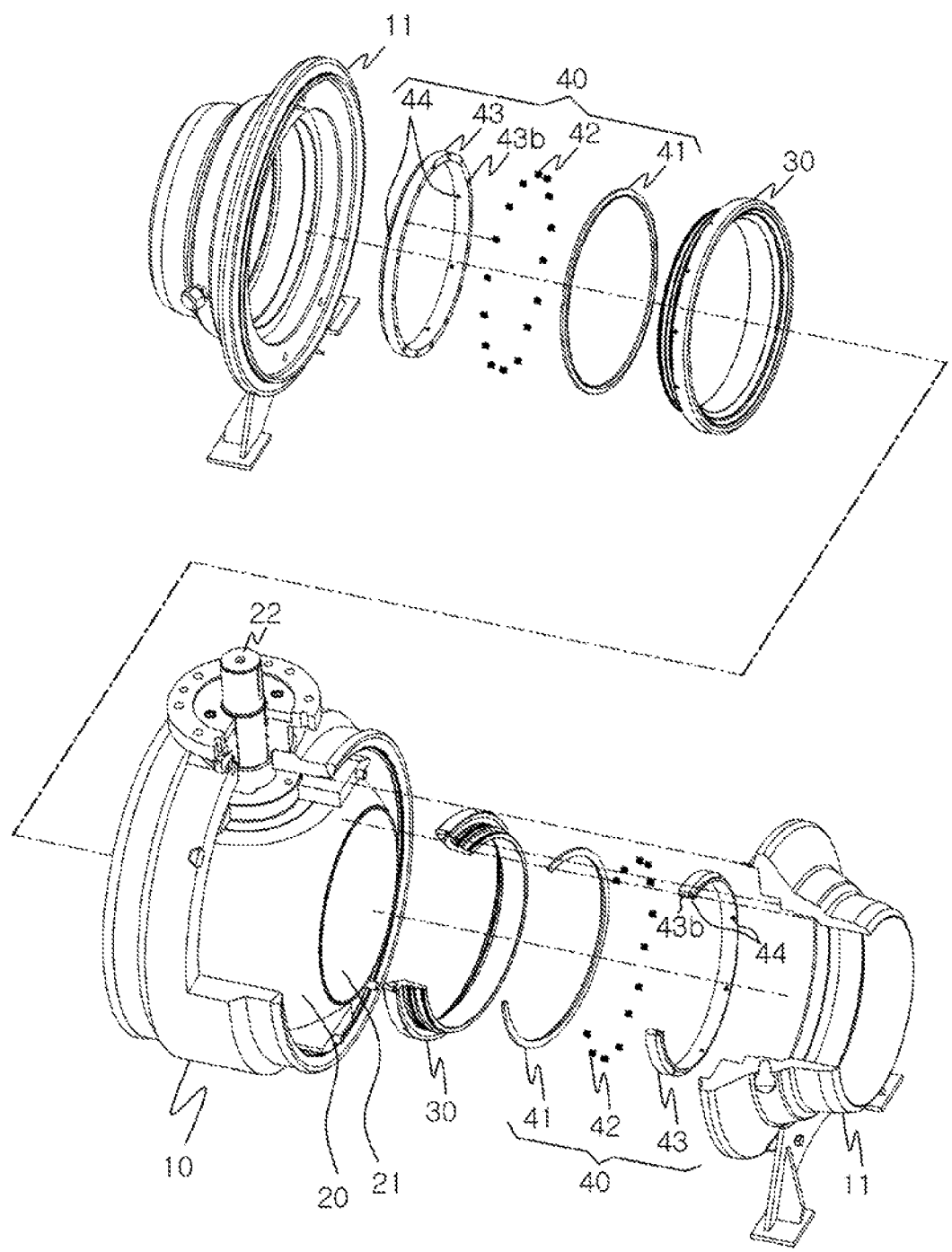

BALL VALVE WITH DUAL SEALING STRUCTURE

CROSS-REFERENCE TO RELATED APPLICATIONS

This patent application claims priority under 35 U.S.C. § 119 to Korean Patent Application No. 10-2016-0102089, filed on Aug. 11, 2016, in the Korean Intellectual Property Office, the disclosure of which is incorporated by reference herein in its entirety.

TECHNICAL FIELD

Embodiments of the present disclosure concern ball valves, and more specifically, a dual sealing ball valve structure having a main sheet and an elastic sheet structured to be tightly fitted into holes in a sheet holder without leaving a gap.

DISCUSSION OF RELATED ART

A ball valve connects together conduits to control flow through it. Dual sealing structures are sometimes used to secure a stable ball operation while enhancing sealing capability.

FIG. 1 is a cross-sectional view illustrating a dual-sealing ball valve according to the prior art.

Referring to FIG. 1, a fluid through hole 3a is formed in the ball 3 to pass through the ball 3. The ball 3 is positioned inside a valve body 1. Conduit connectors 2 are coupled to both sides of the valve body 1. The ball 3 is rotated by rotating a stem 3b that passes through the valve body 1 to open and close the flowpath between the conduit connectors 2 through the fluid pass-through hole 3.

To seal off the ball 3 when the ball 3 rotates, a sheet holder 4 and a pressurizing retainer 7 are provided on the inner circumferential surface of each of the conduit line connectors 2. The sheet holder 4 has a groove 4a formed in the front surface that faces the ball 3. A valve sheet 5 is fitted into the groove 4a to tightly contact the surface of the ball 3 around the fluid through hole 3 when the flowpath is opened. The pressurizing retainer 7 elastically pushes the sheet holder 4 towards the ball 3.

An elastic sheet 6 may be added separately from the valve sheet 5 to provide a dual-sealing structure.

Typically, the valve sheet 5 functions as a main sheet, and the elastic sheet 6 functions as an auxiliary sheet. Such dual-sealing structure reinforces sealing capability and contributes to a stable ball operation.

To ensure a stable contact and contact surface pressure between the ball 3 and the sheets 5 and 6, no gap need to be left between the groove 4a and the sheets 5 and 6 fitted into the groove 4a.

Conventionally, the sheets 5 and 6 are press-fittingly inserted into the groove 4a not to leave a gap therebetween, and parts of the sheets 5 and 6, which are to be brought in contact with the ball 3, are then cut away.

Such way, however, imposes various limitations on producing ball valves—e.g., the valve sheet 5 needs to be made of soft material, the process is complicated, and a fine ball contact surface is hard to make.

The elastic sheet 6 is formed of, a so-called 'delta ring' that has a triangular cross section as shown in FIG. 1. The elastic sheet 6 is fitted into the groove 4a, and the valve sheet 5 is then forcedly fitted into a remaining space of the groove 4a.

In this case, the elastic sheet 6 is insufficiently compressed and thus presents poor sealability.

SUMMARY

According to an embodiment of the present disclosure, there is provided a dual sealing ball valve. A main sheet, e.g., a valve sheet, and an auxiliary sheet, e.g., an elastic sheet, may be equipped in a sheet holder without leaving a gap during which the elastic sheet may sufficiently be compressed. Further, a pressurizing retainer for adjusting and maintaining contact surface pressure may have a more simplified structure.

According to an embodiment of the present disclosure, a dual sealing ball valve comprises a valve body, conduit line connectors coupled to both sides of the valve body, a ball disposed in the valve body, having a fluid through hole pass therethrough, and rotated to open and close a flowpath through the fluid through hole between the conduit line connectors, a sheet holder mounted on an inner circumferential surface of at least one of the conduit line connectors, a main sheet tightly contacting and sealing a surface of the ball around the fluid through hole when the flowpath is opened and mounted on a front surface of the sheet holder, and an elastic sheet mounted on the front surface of the sheet holder. The main sheet may overlap the elastic sheet. The sheet holder may include a sheet ring supporting the main sheet and the elastic sheet in a front direction, supporting the elastic sheet towards the main sheet, and pushed in the front direction by a pressurizing retainer and a sheet cap coupled to the sheet ring and contacting the main sheet to pressurize the main sheet in a rear direction and towards the elastic sheet.

According to an embodiment of the present disclosure, the sheet cap may be coupled to the sheet ring while adjusting a pressurizing force applied to the main sheet.

According to an embodiment of the present disclosure, the main sheet may cover a front surface of the elastic sheet except for a portion of the front surface to contact the ball to compress the elastic sheet in the same direction of a direction of pressurization by the sheet cap.

According to an embodiment of the present disclosure, a surface of the main sheet, which is positioned opposite the elastic sheet, may include an inclined surface pressed by the sheet cap pressurized in a rear direction to allow a pressurizing force to be applied towards the elastic sheet.

According to an embodiment of the present disclosure, the elastic sheet may be formed of a ring having a cross section shaped as a rectangle with a cut-away corer so that a front inner circumferential surface-side corner of the elastic sheet tightly contacts the ball. The main sheet may tightly contact the elastic sheet while covering an outer circumferential surface and an outer circumferential surface-side front surface of the elastic sheet. An outer circumferential surface of the main sheet may include an inclined surface allowing an outer diameter of the main sheet to increase in a rear direction. The sheet cap may tightly contact the main sheet while covering an outer circumferential surface and an outer circumferential surface-side front surface of the main sheet. The sheet cap may include a screw hole formed in an outer circumferential surface thereof, a bolt having an end whose cross section is shaped as a cone or a truncated cone and screwed to the screw hole. The sheet ring may support an inner circumferential surface of the elastic sheet and rear surfaces of the main sheet and the elastic sheet. The sheet ring may include a hole having an inclined surface along which an end of the bolt is slid in the rear direction when inserted into the hole. As an end of the bolt is inserted into the hole, the main sheet may be pulled in the rear direction.

According to an embodiment of the present disclosure, a pressurizing retainer may be mounted on the inner circumferential surface of at least one of the circumferential surface to elastically push the sheet holder towards the ball. The pressurizing retainer may include a spring elastically pushing the sheet ring and an adjust ring supported on the inner circumferential surface of the at least one of the circumferential surfaces to back up a rear of the spring and to elastically push the sheet ring through the spring and including a screw hole formed in a rear surface of the adjusting ring. An adjusting bolt may be screwed to the screw hole. The adjusting bolt may have a cross section shaped as a cone or a truncated cone. A support surface supporting the rear surface of the adjusting ring on the inner circumferential surface of the at least one circumferential surface may allow an end of the adjusting bolt to be inserted and slid in a front direction to push the adjust ring in the front direction as the end of the adjusting bolt is inserted.

According to the embodiments of the present disclosure, the sheet holder 30 having the groove where the main sheet 33 and the elastic sheet 34 are to be fitted may separately be prepared. The sheet holder 30 includes the sheet ring 31 for supporting the rear of the main sheet 33 and the elastic sheet 34 and sheet cap 32 coupled to the sheet ring 31 to pressurize the main sheet 33 towards the elastic sheet 34 and in the rear direction. When the sheet cap 32 is coupled and fastened to the sheet ring 31, the main sheet 33 and the elastic sheet 34 are tightened in the groove. Thus, the main sheet 33 and the elastic sheet 34 can be equipped without leaving a gap, and the elastic sheet 34 may sufficiently be compressed. Thus, a better sealing capability is obtained.

According to an embodiment of the present disclosure, the elastic sheet 34 is, at least partially, surrounded by the main sheet 33 to compress the elastic sheet 34 in the same direction as that of a pressurizing force applied to the main sheet 33. Thus, the elastic sheet 34 may be compressed at multiple points, affording the elastic sheet 34 better sealability and better durability in controlling high-pressure flow.

According to an embodiment of the present disclosure, the pressurizing retainer 40 may have a more simplified structure, contributing to more stable contact surface pressure and enhanced durability.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 3 is a cross-sectional view illustrating a dual sealing ball valve according to an embodiment of the present disclosure;

FIG. 4 is an expanded view illustrating a portion where a main sheet and an elastic sheet are mounted in a dual sealing ball valve according to an embodiment of the present disclosure;

FIG. 5 is a partial cutaway perspective view illustrating a sheet holder according to an embodiment of the present disclosure;

FIG. 6 is a cutaway perspective view illustrating a sheet holder according to an embodiment of the present disclosure; and FIG. 7 is a perspective view illustrating a process for assembling a dual sealing ball valve according to an embodiment of the present disclosure.

DETAILED DESCRIPTION OF EXEMPLARY EMBODIMENTS

Hereinafter, exemplary embodiments of the present disclosure will be described in detail with reference to the accompanying drawings. Like reference denotations may be used to refer to the same or similar elements throughout the specification and the drawings.

The present disclosure, however, may be modified in various different ways, and should not be construed as limited to the embodiments set forth herein. As used herein, the singular forms "a," "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present.

Figure 1:
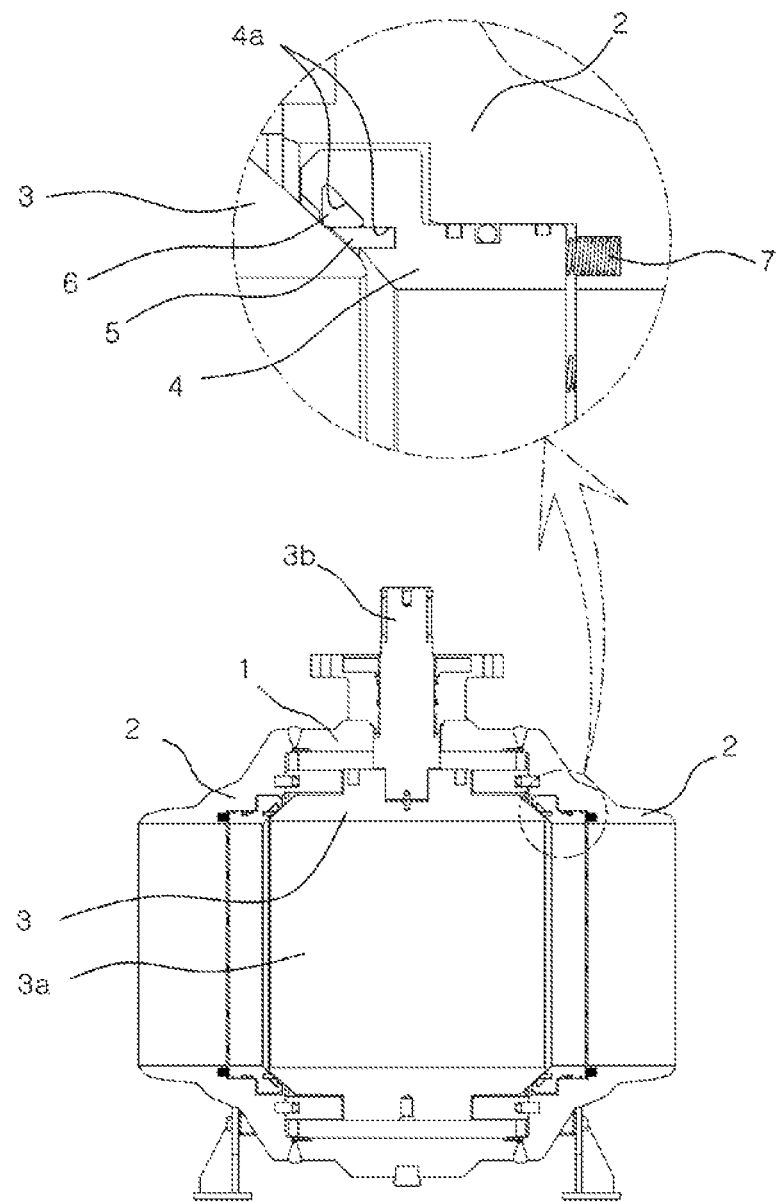
FIG. 1 is a cross-sectional view illustrating a dual sealing ball valve according to the prior art.
Figure 2:
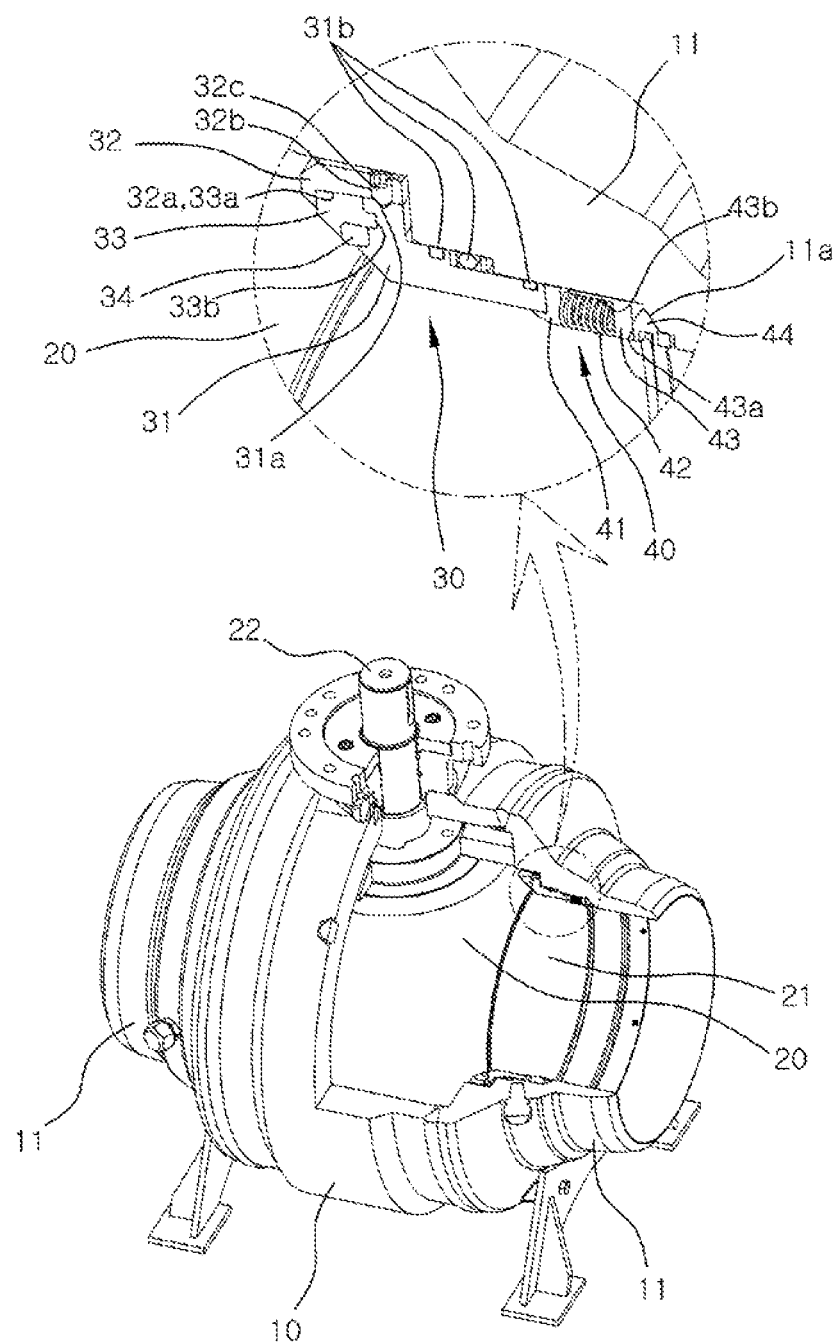
FIG. 2 is a partial cutaway perspective view illustrating a dual sealing ball valve according to an embodiment of the present disclosure.

FIG. 2 is a perspective view illustrating a dual sealing ball valve according to an embodiment of the present disclosure. Referring to FIG. 2, the dual sealing ball valve includes a valve body 10 and a left conduit line connector 11 and a right conduit line connector 11 that are respectively coupled to a left and right side of the valve body 10. FIG. 2 illustrates a partial cutaway perspective view wherein a portion coupled to the right conduit line connector 11 is cut away so that a ball 22 received inside the valve body 10 is seen from the outside. A sheet holder 30 and a pressurizing retainer 40 are mounted on the inner circumferential surface of the conduit line connectors. 11.

FIG. 3 is a cross-sectional view illustrating a dual sealing ball valve according to an embodiment of the present disclosure.

FIG. 4 is an expanded view illustrating a portion where a main sheet 33 and an elastic sheet 34 are mounted in a dual sealing ball valve according to an embodiment of the present disclosure.

FIG. 5 is an exploded perspective view illustrating a sheet holder 30 according to an embodiment of the present disclosure.

FIG. 6 is a cutaway perspective view illustrating a sheet holder 30 according to an embodiment of the present disclosure.

FIG. 7 is a perspective view illustrating a process for assembling a dual sealing ball valve according to an embodiment of the present disclosure.

As used herein, the term "front" may refer to a direction from an inlet of the conduit line connector 11 to the ball 20, and the term "rear" may refer to the opposite direction.

Referring to FIGS. 1 to 7, according to an embodiment of the present disclosure, a dual sealing ball valve may include a valve body 10, a ball 20, a sheet holder 30, and a pressurizing retainer 40. Conduit line connectors 11 for connecting conduit lines together are coupled to both sides of the valve body 10 to communicate with an inside of the valve body 10. The ball 20 is received inside an inner space of the valve body 10. The ball 20 includes a fluid through hole 21 that passes through an inside of the ball 20. The ball 20 may be rotated by a stem 22 to open and close a flowpath through the fluid through hole 21 between the conduit line connectors 11. The stem 22 passes through the valve body 10 in a direction perpendicular to a direction of a passage of the fluid through hole 21 and that is exposed to the outside. A sheet holder 30 is mounted on the inner circumferential surface of the conduit line connectors 11 to seal off between the valve body 10 and the ball 20. The pressurizing retainer 40 is provided on a portion of the inner circumferential surface of the conduit line connectors 11, which is positioned at a rear side of the sheet holder 30. The pressurizing retainer 40 elastically pushes the sheet holder 30 to the ball 20.

The valve body 10, the conduit line connectors 11, the ball 20, and the stem 22 may be known components. Thus, no detailed description thereof is thus given below, and the description primarily focuses on the sheet holder 30 and the pressurizing retainer 40 in light of the structure and the way they are mounted.

The sheet holder 30 may be a ring-shaped component. A step may be formed in an inner circumferential surface of one of both ends of the conduit line connector 11—e.g., the end of the conduit line connector 11 fastened to the valve body 10. The sheet holder 30 may be fitted into the steps. The inner diameter of the sheet holder 30 may be the same as the inner diameter of the conduit line connector 11.

Annular grooves may be formed in a circumferential surface of the sheet holder 30 that faces the ball 20. A ring-shaped main sheet 33 and a ring-shaped elastic sheet 34 may be tightly fitted into the annular grooves to tightly contact the surface of the ball 20 around the inlet of the fluid through hole 21 while the fluid through hole 21 is aligned with the internal passage of the conduit line connectors 11. As such, the main sheet 33 and the 34 may be brought in tight contact with the surface of the ball 20 while surrounding the inlet of the fluid through hole 21, with the flowpath opened. The main sheet 33 and the elastic sheet 34 may also remain in tight contact with the surface of the ball 20 even when the ball 20 is rotated by 90 degrees to close the flowpath so that the fluid through hole 21 is not positioned on the main sheet 33 and the elastic sheet 34.

The main sheet 33 may be a valve sheet typically used for ball valves. The main sheet 33 may be formed of stainless steel, nickel alloy steel, plated steel or any other types of metals, polytetrafluoroethylene (PTFE), perfluoroalkoxy alkane (PFA)r, reinforced PTFE, or any other fluoride, PEEK, Teflon or any other polyether compound, Delrin or any other polymethylene-based compound, or any other various materials. For example, the main sheet 33 may be formed of a material appropriate for the type of fluid, the size of the ball valve, or use environments.

The elastic sheet 34 may be formed of a material having rubber elasticity, e.g., a synthetic resin, natural rubber, or synthetic rubber.

According to an embodiment of the present disclosure, the main sheet 33 and the elastic sheet 34 may be overlap each other so that one of the main sheet 33 and the elastic sheet 34 tightly contacts and surrounds the outer circumferential surface of the other.

The sheet holder 30 may push and support the main sheet 33 and the elastic sheet 34 in a front direction while tightly contacting the main sheet 33 and the elastic sheet 34, allowing the elastic sheet 34 to be compressed when the main sheet 33 presses the elastic sheet 34. The sheet holder 30 may include a sheet ring 31 that receives a force of allowing the sheet ring 31 to be pushed in the front direction by a pressurizing retainer 40 and a sheet cap 32 coupled with the sheeting ring 31 to pressurize the main sheet 33 in a rear direction and towards an internal center of the elastic sheet 34 while adjusting the force of pressurizing the main sheet 33.

The sheet cap 32 is configured to cover the whole or part of a front surface of the main sheet 33 except for a portion of the front surface to contact the ball 20 and a portion of the outer circumferential surface of the main sheet 33 which is positioned opposite the elastic sheet 34.

The sheet ring 31 has a groove 31a to which an end of a fastening bolt 32c is fitted. The fastening bolt 32c passes through the sheet cap 32 to be screwed to the sheeting ring 31. The groove 31a has an inclined surface that allows the end of the fastening bolt 32c to be slid in the rear direction so that as the fastening bolt 32 is inserted to the groove 31a, the sheet cap 32 is moved towards the sheet ring 31. A plurality of fastening bolts 32c may be provided at intervals along the circumference of the sheet cap 32 so that the sheet cap 32 is fastened while the whole circumference of the sheet cap 32 is pushed in the rear direction.

The surface of the main sheet 33 which is positioned opposite the surface contacting the elastic sheet 34 may be an inclined surface that is tightly contacted and pressed by the sheet cap 32 to be pressurized towards the elastic sheet 34 as the sheet cap 32 is pressurized in the rear direction. Thus, when the sheet cap 32 is pushed in the rear direction to be coupled with the sheet ring 31, the main sheet 33 may be tightly contacted by the sheet cap 32 supporting its rear part, pressurizing and compressing the elastic sheet 34.

The main sheet 33 is configured to cover the whole or part of a front surface of the elastic sheet 34 except for a portion of the front surface to come in tight contact with the ball 20. Thus, the elastic sheet 34 is compressed in the same direction as the direction of being pressurized by the sheet cap 32.

Accordingly, the main sheet 33 and the elastic sheet 34 may be brought in tight contact with each other without leaving a gap and are fastened without leaving a gap by the sheet ring 31 and the sheet cap 32 that cover the surface of the main sheet 33 and the elastic sheet 34 except for a portion to contact the ball 20.

In contrast to the conventional art, the main sheet 33 and the elastic sheet 34 may first be cut into shape and processed and may then be securely fitted into the sheet holder 30 without leaving any gap.

An example in which the elastic sheet 34 is fitted onto the inner circumferential surface of the main sheet 33 is described below with reference to FIGS. 2 to 7.

The elastic sheet 34 is formed of a ring that has a cross section shaped as a rectangle with a cut-away corner. An edge of a front inner circumferential surface of the elastic sheet 34 may be taken as a portion to tightly contact the ball 20.

The main sheet 33 may be fitted over the elastic sheet 34. The main sheet 33 may be extended to cover the front surface of the elastic sheet 34 except for the surface of a corner portion of the elastic sheet 34. The extended main sheet 33 may previously be cut into the shape that fits the shape of the surface of the ball 20 so that the main sheet 33 may tightly contact the ball 20. The outer circumferential surface of the main sheet 33 includes the inclined surface 33a by which the outer diameter of the main sheet 33 increases in the rear direction. The inclined surface 33a starts from a front end of the main sheet 33 and has a predetermined length.

The sheet ring 31 includes a surface that contacts the rear surface of the main sheet 33 and the elastic sheet 34 that overlap each other, a surface that contacts and supports a rear side of the elastic sheet 34, and an open step at its upper portion. The sheet ring 31 pushes and supports the main sheet 33 and the elastic sheet 34 from the rear towards the ball 20 by the pressurizing retainer 40. The sheet ring 31 also supports the elastic sheet 34, which is to be pressurized in the direction of the radius by the main sheet 33, on the inner circumferential surface The front portion of the sheet ring 31 which supports the rear of the main sheet 33 and the elastic sheet 34 may have an outer diameter identical or slightly smaller than the outer diameter of the main sheet 33. A groove 31a with a V-shaped cross section may be formed in the outer circumferential surface of the sheet ring 31.

The main sheet 33 may have a protrusion 33b at the rear surface, and the sheet ring 31 may have a hole formed in the surface that contacts the rear surface of the main sheet 33. The protrusion 33b may be fitted into the hole of the sheet ring 31, allowing the main sheet 33 to stably be positioned on the sheet ring 31.

Multiple sealing materials 31b may be provided at a rear portion of the sheet ring 31 to seal gaps between the sheet ring 31 and the inner circumferential surface of the conduit line connector 11.

Referring to FIG. 4, the sheet cap 32 covers the outer circumferential surface and front surface of the main sheet 33. A portion of the outer circumferential surface of the main sheet 33, which covers the inclined surface 33a, has an inclined surface 32a that has the same inclined angle θ as the inclined surface 33a so that the sheet cap 32 tightly contacts the main sheet 33 over the whole outer circumferential surface of the main sheet 33. The sheet cap 32 extends from where it covers the outer circumferential surface of the main sheet 33 in the rear direction to cover a front portion of the outer circumferential surface of the sheet ring 31.

A portion of the sheet cap 32, which covers the outer circumferential surface of the sheet ring 31 has a plurality of screw holes 32b along its outer circumferential surface. The screw holes 32b may be formed to pass through the sheet cap 32 and to have female threads. The screw holes 32b may be formed to be slightly inclined to the front with respect to the groove 31a of the sheet ring 31.

A force applied upon coupling the sheet cap 32 to the sheet ring 31 is described below with reference to FIG. 4. Referring to FIG. 4, a force generated upon inserting the fastening bolt 32c is denoted in a dashed arrow.

As the fastening bolt 32c whose cross section is shaped as a cone or truncated cone is screwed and inserted to the screw hole 32b, a side surface of an end of the fastening bolt 32c comes in contact with the front inclined surface of the 'V'-shaped groove 31a and is then slid and inserted deep along the front inclined surface of the groove 31a, generating a force of pulling the sheet cap 32 to the sheet ring 31. As such, the force 32 of pulling the sheet cap 32 in the rear direction serves as a force to compress the main sheet 33 to the rear. The force 32 is also applied to the inner circumference-side inclined surface 32a and the outer circumferential surface-side inclined surface 33a that come in tight contact with each other, and the force 32 also serves to compress the main sheet 33 in the direction of the radius and resultantly the elastic sheet 34 fitted on the inner circumferential surface of the main sheet 33.

As such, the compression force applied to the main sheet 33 when coupling the sheet cap 32 to the sheet ring 31 by fitting the fastening bolt 32c, which is screwed while passing through the sheet cap 32, to the groove 31a formed in the outer circumferential surface of the sheet cap 32 allows the main sheet 33 to be fastened to the sheet ring 31 without leaving a gap and may also serve as a force to compress the elastic sheet 34 to fasten the elastic sheet 34 without leaving a gap. Thus, while the elastic sheet 34 is fastened without leaving a gap, the front inner circumferential surface-side corner of the elastic sheet 34 may more stably be brought in tight contact with the ball 20.

Referring to FIGS. 4 and 5, the elastic sheet 34 is fitted into a portion of the sheet ring 31 which supports the inner circumferential surface from the rear of the sheet ring 31, the main sheet 33 is fitted to surround the elastic sheet 34, the sheet cap 32 is fitted to surround the main sheet 33, and then, the fastening bolts 32c are screwed into the screw holes 32b along the circumference. Thus, the sheet holder 30 may be assembled as shown in FIG. 6. As the fastening bolts 32c are tightly screwed, the main sheet 33 and the elastic sheet 34 may be fitted together without leaving a gap. Therefore, the main sheet 33 and the elastic sheet 34 may first be manufactured and assembled with the sheet holder 30.

The sheet holder 30 assembled so may be fitted into a groove that is formed to be moved to the front or rear along the inner circumferential surface of the circumferential surface 11 to bring the main sheet 33 and the elastic sheet 34 in tight contact with the ball 20.

In the inner circumferential surface of the circumferential surface 11, the groove for fitting over the sheet holder 30 is extended in the rear direction to insert and mount the pressurizing retainer 40.

The pressurizing retainer 40 includes an adjust ring 43 that is supported against a support surface 11a which is a rear end of the extended groove, a pressurizing ring 41 that contacts the rear surface of the sheet ring 31 of the sheet holder 30 and is fitted in the rear of the inner circumferential surface, and a plurality of springs 42 spaced apart at intervals along the circumference between the adjust ring 43 and the pressurizing ring 41. The respective rear portions of the springs 42 are inserted into spring insertion holes 43b formed in the front surface of the adjust ring 43.

The springs 42 may be compression springs.

The springs 42 may be backed up from the rear by the adjust ring 43 which is supported on the inner circumferential surface of the circumferential surface 11, and the sheet holder 30 may elastically be pushed to the front by the springs 42.

According to an embodiment of the present disclosure, an elastic force applied to the sheet holder 30 by the springs 42 may be adjusted as the adjust ring 43 moves in the front or rear direction.

A plurality of screw holes 43a having female threads may be formed in the direction of the diameter of the inner circumferential surface (e.g., a direction towards the outer circumferential surface) in a rear portion of the adjust ring 43 along the circumference thereof. The rear portion of the adjust ring 43 may be tapered so that the outer diameter of the adjust ring 43 reduces in the rear direction, and a portion of the adjust ring 43 which covers the rear surface of the screw holes 43a is cut away.

The support surface 11a of the circumferential surface 11 is formed to be an inclined surface to tightly contact the tapered rear surface of the adjust ring 43. For example, the support surface 11a is formed to be an inclined surface allowing the inner diameter of the conduit line connector 11 to increase in the front direction.

Adjusting bolts 44 having a cross section shaped as a cone or truncated cone may be screwed to the screw holes 43a. As the adjusting bolts 44 are screwed deeper, the adjusting bolts 44 are guided along the inclined support surface 11a to be slid to the front, pushing the adjust ring 43 in the front direction.

Thus, the degree of compression by the springs 42 may be adjusted by properly adjusting the depth of insertion of the adjusting bolts 44 into the screw holes 43a. In this case, an elastic restoration force is applied to the sheet holder 30 according to the degree of compression by the springs 42, thereby enabling adjustment of the press applied to the contact surface between the main sheet 33 and the elastic sheet 34 and the ball 20.

Referring to FIG. 7, the step of fitting the adjust ring 43, with the adjusting bolts 44 screwed to the screw holes in such an extent that their ends are not projected from the outer circumference, into the inside of the conduit line connector 11, the step of fitting the springs 42 into the spring insertion holes 43b, the step of fitting the pressurizing ring 41 into the inside of the conduit line connector 11 to contact the springs 42, the step of fitting the sheet holder 30 into the inside of the conduit line connector 11 to be seated on the pressurizing ring 41, and the step of coupling the conduit line connector 11 to the valve body 10 may sequentially be carried out, and the surface pressure may then be adjusted by adjusting the depth of insertion of the adjusting bolts 44 inside the conduit line connector 11.

As such, contact surface pressure can be adjusted by simplified components, e.g., the adjusting bolts 44 and the support surface 11a and may remain stable upon use of the ball valve assembled. Further, simplified components enable easier assembly.

While the present disclosure has been shown and described with reference to exemplary embodiments thereof, it will be apparent to those of ordinary skill in the art that various changes in form and detail may be made thereto without departing from the spirit and scope of the present disclosure as defined by the following claims.

What is claimed is:

1. A dual sealing ball valve, comprising:
   a valve body;
   conduit line connectors coupled to both sides of the valve body;
   a ball disposed in the valve body, having a fluid through hole pass therethrough, and rotated to open and close a flowpath through the fluid through hole between the conduit line connectors;
   a sheet holder mounted on an inner circumferential surface of at least one of the conduit line connectors;
   a main sheet tightly contacting and sealing a surface of the ball around the fluid through hole when the flowpath is opened and mounted on a front surface of the sheet holder; and
   an elastic sheet mounted on the front surface of the sheet holder, wherein the main sheet overlaps the elastic sheet, wherein the sheet holder includes a sheet ring supporting the main sheet and the elastic sheet in a front direction, supporting the elastic sheet towards the main sheet, and pushed in the front direction by a pressurizing retainer and a sheet cap coupled to the sheet ring and contacting the main sheet to pressurize the main sheet in a rear direction and towards the elastic sheet.

2. The dual sealing ball valve of claim 1, wherein the sheet cap is coupled to the sheet ring while adjusting a pressurizing force applied to the main sheet.

3. The dual sealing ball valve of claim 1, wherein the main sheet covers a front surface of the elastic sheet except for a portion of the front surface to contact the ball to compress the elastic sheet in the same direction of a direction of pressurization by the sheet cap.

4. The dual sealing ball valve of claim 1, wherein a surface of the main sheet, which is positioned opposite the elastic sheet, includes an inclined surface pressed by the sheet cap pressurized in a rear direction to allow a pressurizing force to be applied towards the elastic sheet.

5. The dual sealing ball valve of claim 1, wherein the elastic sheet is formed of a ring having a cross section shaped as a rectangle with a cut-away corner so that a front inner circumferential surface-side corner of the elastic sheet tightly contacts the ball, wherein the main sheet tightly contacts the elastic sheet while covering an outer circumferential surface and an outer circumferential surface-side front surface of the elastic sheet, wherein an outer circumferential surface of the main sheet includes an inclined surface allowing an outer diameter of the main sheet to increase in a rear direction, wherein the sheet cap tightly contacts the main sheet while covering an outer circumferential surface and an outer circumferential surface-side front surface of the main sheet, and the sheet cap includes a screw hole formed in an outer circumferential surface thereof, a bolt having an end whose cross section is shaped as a cone or a truncated cone being screwed to the screw hole, wherein the sheet ring supports an inner circumferential surface of the elastic sheet and rear surfaces of the main sheet and the elastic sheet, wherein the sheet ring includes a hole having an inclined surface along which an end of the bolt is slid in the rear direction when inserted into the hole, and wherein as an end of the bolt is inserted into the hole, the main sheet is pulled in the rear direction.

6. The dual sealing ball valve of claim 1, wherein a pressurizing retainer is mounted on the inner circumferential surface of at least one of the circumferential surface to elastically push the sheet holder towards the ball, and wherein the pressurizing retainer includes a spring elastically pushing the sheet ring and an adjust ring supported on the inner circumferential surface of the at least one of the circumferential surfaces to back up a rear of the spring and to elastically push the sheet ring through the spring and including a screw hole formed in a rear surface of the adjusting ring, wherein an adjusting bolt is screwed to the screw hole, wherein the adjusting bolt has a cross section shaped as a cone or a truncated cone, and wherein a support surface supporting the rear surface of the adjusting ring on the inner circumferential surface of the at least one circumferential surface allows an end of the adjusting bolt to be inserted and slid in a front direction to push the adjust ring in the front direction as the end of the adjusting bolt is inserted.

* * * * *